Patented Oct. 15, 1940

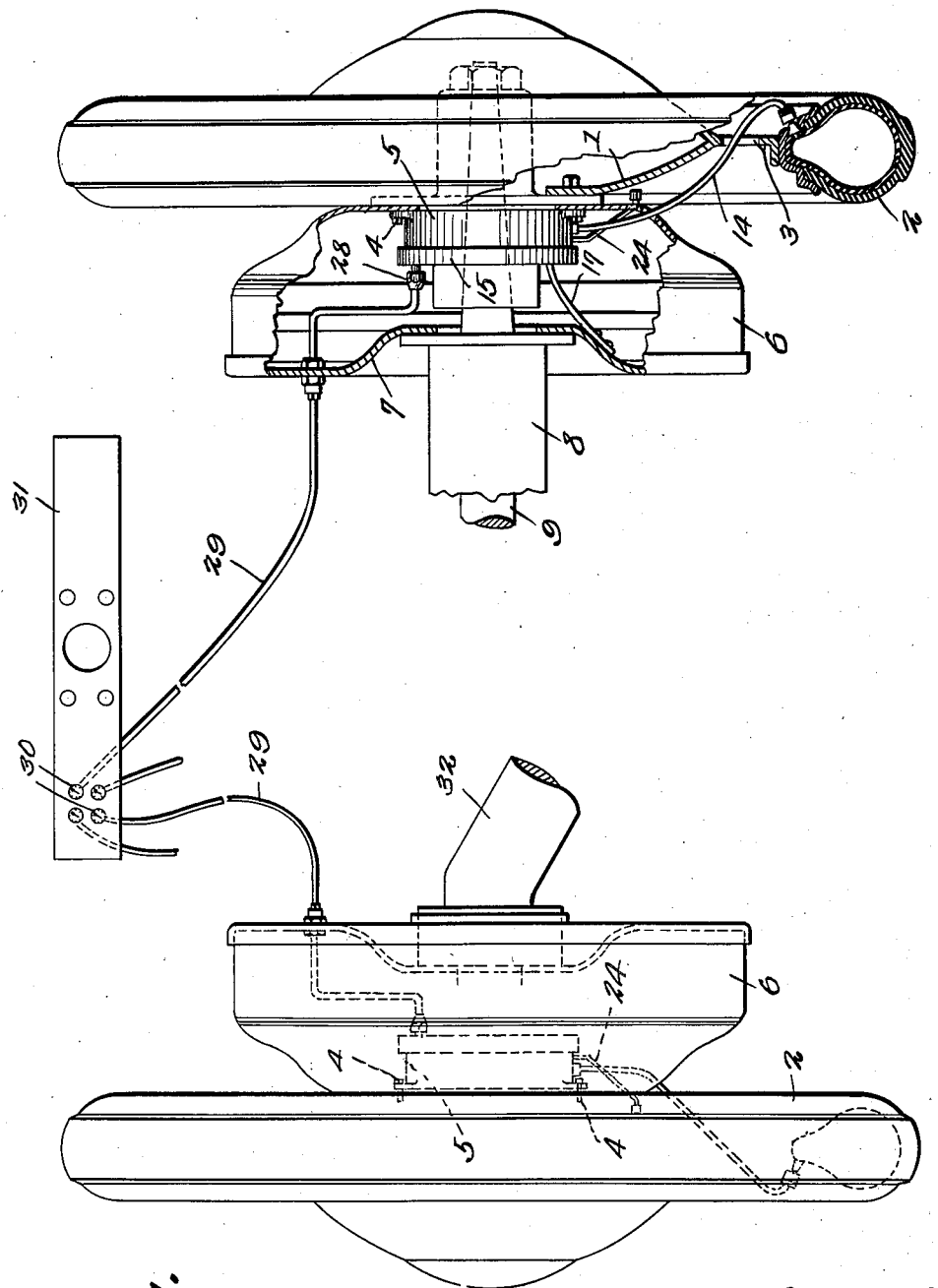

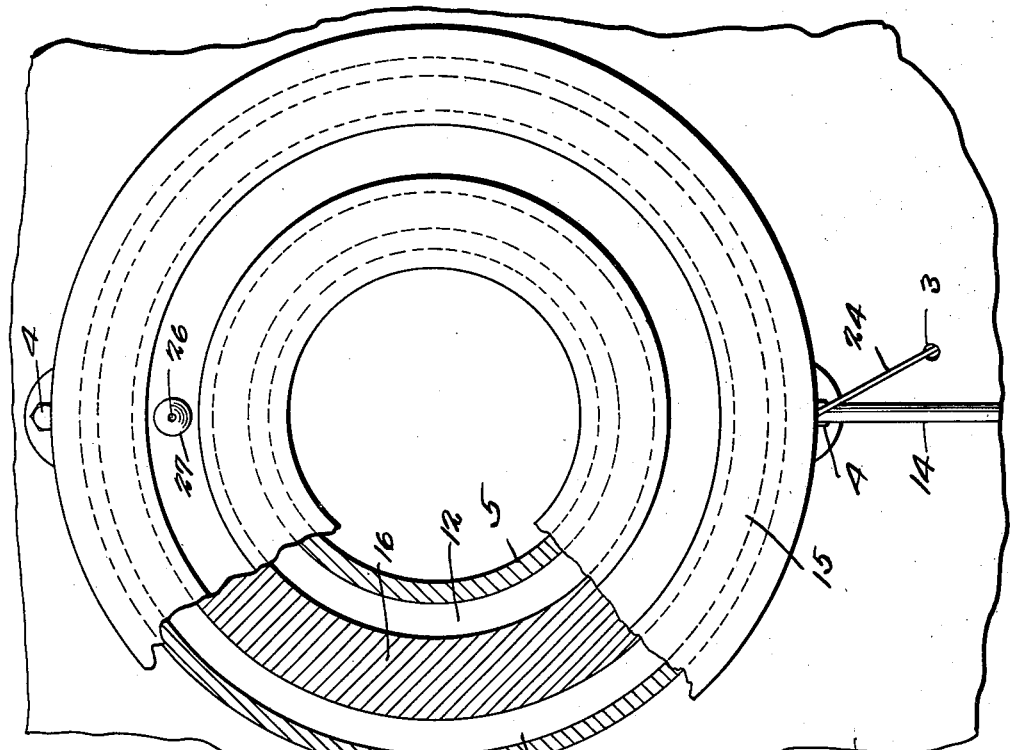

2,218,143

UNITED STATES PATENT OFFICE 2,218,143

TIRE PRESSURE INDICATOR

Roy R. Birchfield, Shreveport, La.

Application December 11, 1939, Serial No. 308,742

1 Claim. (Cl. 73—31)

This invention aims to provide novel means whereby the pressure in the tires of the wheels of a vehicle can be ascertained readily at a glance, from a fixed place on the vehicle.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:

Fig. 1 shows, in elevation, front and rear wheels of a vehicle wherein the device forming the subject matter of this application has been incorporated, parts being in section;

Fig. 2 is a sectional view showing the means whereby a passage of air from the vehicle tire to the indicating mechanism is made possible;

Fig. 3 is an elevation of the structure shown in Fig. 2, parts being broken away.

The numeral 1 marks a wheel body, carrying an inflatable tire 2. There are holes 3 in the wheel body 1.

Securing elements 4 attach a ring or distributor 5, and an annular member 6, such as a brake drum, to the wheel body 1. The numeral 7 marks a closure for the brake drum 6. The closure 7 is secured to an axle housing 8. An axle 9 is mounted to turn in the axle housing 8, the ring or distributor 5, and consequently the wheel body 1 and associated parts, being secured to the axle.

In cross section, the distributor 5 is trough-shaped, as Fig. 2 will show. The distributor 5 has an inwardly projecting annular flange 10 and an inwardly projecting annular flange 11. The flanges 10 and 11 form an annular air passage 12 in the distributor 5. A conduit 14, which may be a tube, flexible or otherwise, leads through one of the holes 3 in the wheel body 1. One end of the conduit 14 is secured to the distributor 5 and communicates with the passage 12. The opposite end of the conduit 14 is secured to the wheel body 1 and communicates with the tire 2. A clamp ring 15 is threaded on the distributor 5. A fixed bearing and air delivery member 16 is provided, and in order that it may be prevented from rotating with the wheel and the ring 5, the member 16 is connected by brackets 17, or by any other appropriate means, to the fixed closure 7 for the brake drum 6.

The delivery member 16 extends between the flanges 10 and 11 of the distributor 5. The air delivery member 16 has an outwardly projecting flange 18, disposed opposite to the flange 10 of the distributor 5, and an inwardly projecting annular flange 19, disposed opposite to the flange 11 on the distributor 5. The flanges 18 and 10, and 19 and 11, form raceways, in which ball bearings 20 are mounted. For the prevention of the escape of air, washers 21 are located within and without the delivery member 16, one set of washers bearing against the flange 18, and the other set of washers bearing against the flange 19. The clamping ring 15 exerts pressure on the washers 21.

For the lubrication of the balls 20 in the ball races, the ball races are connected by a duct 22 in the air delivery member 16. The outer wall of the distributor 5 has a duct 23, leading to one of the ball races. One end of a conduit 24 is secured to the distributor 5 and communicates with the duct 23. The opposite end of the conduit 24 extends through one of the holes 3 in the wheel body 1, and is closed by a cap 25, removably mounted in place.

The delivery member 16 is supplied with a transverse duct 26, communicating at one end with the passage 12 in the ring or distributor 5. The opposite end of the duct 26 communicates with a nipple 27 on the delivery member 16, the nipple carrying a coupling 28 joined to an air conduit 29, which extends forwardly to a pressure gauge 30, mounted on the instrument board 31 of the vehicle, or elsewhere.

All wheels of the vehicle are equipped in the manner hereinbefore specified, and, noting that the numeral 32 in Fig. 1 designates the front axle of the vehicle, it will be obvious that the front wheels as well as the rear wheels fall within the field of operation of the device.

Air pressure in the tire 2 passes by way of the conduit 14 to the channel 12 of the ring or distributor 5 on the wheel 1. From the passage 12, air traverses the duct 26 in the delivery member 16, and by means of the pipe 29, the air pressure is transferred to the gauge 30. An inspection of the gauge 30 will inform the operator as to the pressure in the tire. The operator has before him, at all times, a visible reminder of the pressure carried by any tire.

Some of the oil delivered to the ball races finds its way to the packings 21, between the flanges 18 and 19 and the wall of the distributor 5, and, consequently, the packings 21 are preserved, kept alive, and thereby are better adapted to hold air.

I claim:

In a device for displaying pressure in a tire on a wheel of a vehicle, a distributor secured to the wheel and having an annular passage, a conduit extended between the distributor and the tire and communicating with the passage, an annular delivery member extended into the distributor and having a bore communicating with the passage, a pressure indicator on the vehicle, a conduit leading from the bore to the indicator, means for holding the delivery member against rotation, the distributor and the delivery member having oppositely projecting flanges defining races, the delivery member having a duct connecting the races, anti-friction bearings in the races, packings assembled with the delivery member and disposed opposite the races, means on the distributor for holding the packings, and means for supplying a lubricant to the packings, by way of the races, the duct, and the interior of the distributor.

ROY R. BIRCHFIELD.